US012810122B2

(12) United States Patent
Park et al.

(10) Patent No.: US 12,810,122 B2
(45) Date of Patent: Nov. 24, 2026

(54) APPARATUS AND METHOD FOR CONTROLLING GRAPH NEURAL NETWORK BASED ON CLASSIFICATION INTO CLASS AND DEGREE OF GRAPH, AND RECORDING MEDIUM STORING INSTRUCTIONS TO PERFORM METHOD FOR CONTROLLING GRAPH NEURAL NETWORK BASED ON CLASSIFICATION INTO CLASS AND DEGREE OF GRAPH

(71) Applicant: Korea Advanced Institute of Science and Technology, Daejeon (KR)

(72) Inventors: Chanyoung Park, Daejeon (KR); Sukwon Yun, Daejeon (KR); Kibum Kim, Daejeon (KR); Kanghoon Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 468 days.

(21) Appl. No.: 18/522,470

(22) Filed: Nov. 29, 2023

(65) Prior Publication Data

US 2024/0185036 A1 Jun. 6, 2024

(30) Foreign Application Priority Data

Dec. 2, 2022 (KR) ........................ 10-2022-0166754

(51) Int. Cl.
*G06N 3/0455* (2023.01)
*G06N 3/096* (2023.01)

(52) U.S. Cl.
CPC ........... *G06N 3/0455* (2023.01); *G06N 3/096* (2023.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

2018/0232443 A1* 8/2018 Delgo .................. G06F 16/367
2019/0306259 A1* 10/2019 Burghardt ............ B26B 19/388
(Continued)

OTHER PUBLICATIONS

Office Action of the KR application No. 10-2023-0120621 dated Dec. 8, 2025.

(Continued)

*Primary Examiner* — Hung D Le
(74) *Attorney, Agent, or Firm* — NKL LAW; Jae Youn Kim

(57) ABSTRACT

There is provided a neural network control apparatus. The apparatus comprises a memory; and a processor configured to: classify a target node into a head group or a tail group based on a reference feature value for each class included in a graph structure; determine, if the target node is classified into the head group, a class of the target node by using a first neural network trained to derive embeddings based on a node with a class corresponding to the head group among nodes included in the graph structure; and determine, if the target node is classified into the tail group, a class of the target node by using a second neural network trained to derive embeddings based on a node with a class corresponding to the tail group among nodes included in the graph structure.

13 Claims, 4 Drawing Sheets

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2021/0034737 | A1 * | 2/2021 | Khan | G06F 21/55 |
| 2022/0092267 | A1 * | 3/2022 | Hou | G06F 40/205 |
| 2022/0171923 | A1 * | 6/2022 | Wu | G06F 18/2413 |
| 2022/0269939 | A1 * | 8/2022 | Zhao | G06N 5/025 |

OTHER PUBLICATIONS

Fenyu Hu et al., “Graph Classification by Mixture of Diverse Experts”, arX1v.2103.15622v1 [cs.LG], Mar. 29, 2021.

* cited by examiner

APPARATUS AND METHOD FOR CONTROLLING GRAPH NEURAL NETWORK BASED ON CLASSIFICATION INTO CLASS AND DEGREE OF GRAPH, AND RECORDING MEDIUM STORING INSTRUCTIONS TO PERFORM METHOD FOR CONTROLLING GRAPH NEURAL NETWORK BASED ON CLASSIFICATION INTO CLASS AND DEGREE OF GRAPH

TECHNICAL FIELD

The present disclosure relates to an apparatus, method, computer-readable storage medium, and computer program for controlling a graph neural network based on classification into a class and degree of a graph.

This work was supported by Institute of Information & communications Technology Planning & Evaluation (IITP) grant funded by the Korea government(MSIT) (NO.2022-0-00077, AI Technology Development for Commonsense Extraction, Reasoning, and Inference from Heterogeneous Data).

BACKGROUND

The long tail phenomenon refers to a distribution of data, when represented graphically based on a specific variable, that is divided into two parts: the head portion of the first 20% of the specific variable, which encompasses the majority of data, and the tail portion of the remaining 80%, which encompasses a small number of data, forming an elongated tail-like shape. In graphs showing the 20:80 distribution pattern according to the long tail phenomenon, the relatively small occurences in the tail portion of the 80% tend to be overlooked.

However, to improve the accuracy of models in artificial intelligence training, a balanced training based on various data is necessary. In terms of an algorithmic perspective, even if an artificial intelligence model is exceptional, training with data, as is, following the long tail phenomenon leads to a significant decrease in accuracy for the tail portion of the remaining 80%, where a small amount of data is dispersely distributed, compared to the accurate judgments for the head portion of the first 20% where the majority of data is distributed. Therefore, the long tail phenomenon of data is one of the major factors that deteriorate the accuracy of artificial intelligence models.

SUMMARY

The present disclosure provides a robust Graph Neural Network (GNN) in case of the long tail phenomenon that occurs in a graph structure by considering the occurrence of the long tail phenomenon in the node classes of a graph structure as well as in the node degrees of the graph structure.

The present disclosure, however, is not limited to those mentioned above, and it may include purposes that can be clearly understood by those skilled in the art, where the present disclosure belongs, from the following description, even if they are not explicitly mentioned.

In accordance with an aspect of the present disclosure, there is provided a neural network control apparatus, the apparatus comprises: a memory storing one or more instructions; and a processor executing the one or more instructions stored in the memory, wherein the instructions, when executed by the processor, cause the processor to: classify a target node into a head group or a tail group based on a reference feature value for each class included in a graph structure; determine, if the target node is classified into the head group, a class of the target node by using a first neural network trained to derive embeddings based on a node with a class corresponding to the head group among nodes included in the graph structure; and determine, if the target node is classified into the tail group, a class of the target node by using a second neural network trained to derive embeddings based on a node with a class corresponding to the tail group among nodes included in the graph structure.

The processor may calculate the reference feature value for each class by averaging feature values of nodes included in the each class included in the graph structure.

The processor may calculate cosine similarity between a feature value of the target node and the reference feature value for each class, and classify the target node into a group including a class with a highest cosine similarity to the target node.

The processor may aggregate the number of nodes for each class included in the graph structure, classify a node included in a class where the number of nodes for each class is greater than a predetermined ratio into the head group, and classify a node included in a class where the number of nodes for each class is less than a predetermined ratio into the tail group.

The processor may aggregate the number of nodes for each degree included in the graph structure, classify a node, among nodes included in the head group, having a degree for which the number of nodes is greater than a predetermined ratio into a head-head group, classify a node, among nodes included in the head group, having a degree for which the number of nodes is less than a predetermined ratio into a head-tail group, classify a node, among nodes included in the tail group, having a degree for which the number of nodes is greater than a predetermined ratio into a tail-head group, and classify a node, among nodes included in the tail group, having a degree for which the number of nodes is less than a predetermined ratio into a tail-tail group.

The first neural network may include a head-head teacher model trained to derive embeddings of the graph structure based on a node included in the head-head group, a head-tail teacher model trained to derive embeddings of the graph structure based on a node included in the head-tail group, and a head student model trained to classify classes of nodes included in the head group based on the nodes included in the head group through knowledge distillation using a loss of the head-head teacher model and a loss of the head-tail teacher model.

The second neural network may include a tail-head teacher model trained to derive embeddings of the graph structure based on a node included in the tail-head group, a tail-tail teacher model trained to derive embeddings of the graph structure based on a node included in the tail-tail group, and a tail student model trained to classify classes of nodes included in the tail group based on the nodes included in the tail group through knowledge distillation using a loss of the tail-head teacher model and a loss of the tail-tail teacher model.

The processor is configured to adjust contribution proportions of the loss of the head-head teacher model and the loss of the head-tail teacher model that contribute to a loss of the head student model to be changed with a progress of training iterations for the head student model, and adjust contribution proportions of the loss of the tail-head teacher model and the loss of the tail-tail teacher model that contribute to a loss of the tail student model to be changed with a progress of training iterations for the tail student model.

In accordance with another aspect of the present disclosure, there is provided a neural network control method preformed by a neural network control apparatus including a memory and a processor, the method comprises: classifying a target node into a head group or a tail group based on a reference feature value for each class included in a graph structure; determining, if the target node is classified into the head group, a class of the target node by using a first neural network trained to derive embeddings based on a node with a class corresponding to the head group among nodes included in the graph structure; and determining, if the target node is classified into the tail group, a class of the target node by using a second neural network trained to derive embeddings based on a node with a class corresponding to the tail group among nodes included in the graph structure.

The classifying the target node may include calculating the reference feature value for each class by averaging feature values of nodes included in the each class included in the graph structure.

The classifying the target node may include calculating cosine similarity between a feature value of the target node and the reference feature value for each class, and classifying the target node into a group including a class with a highest cosine similarity to the target node.

The classifying the target node may include aggregating the number of nodes for each class included in the graph structure, classifying a node included in a class where the number of nodes for each class is greater than a predetermined ratio into the head group, and classifying a node included in a class where the number of nodes for each class is less than a predetermined ratio into the tail group.

The classifying the target node may include aggregating the number of nodes for each degree included in the graph structure, classifying a node, among nodes included in the head group, having a degree for which the number of nodes is greater than a predetermined ratio into a head-head group, classifying a node, among nodes included in the head group, having a degree for which the number of nodes is less than a predetermined ratio into a head-tail group, classifying a node, among nodes included in the tail group, having a degree for which the number of nodes is greater than a predetermined ratio into a tail-head group, and classifying a node, among nodes included in the tail group, having a degree for which the number of nodes is less than a predetermined ratio into a tail-tail group.

The first neural network includes a head-head teacher model trained to derive embeddings of the graph structure based on a node included in the head-head group, a head-tail teacher model trained to derive embeddings of the graph structure based on a node included in the head-tail group, and a head student model trained to classify classes of nodes included in the head group based on the nodes included in the head group through knowledge distillation using a loss of the head-head teacher model and a loss of the head-tail teacher model.

The second neural network includes a tail-head teacher model trained to derive embeddings of the graph structure based on a node included in the tail-head group, a tail-tail teacher model trained to derive embeddings of the graph structure based on a node included in the tail-tail group, and a tail student model trained to classify classes of nodes included in the tail group based on the nodes included in the tail group through knowledge distillation using a loss of the tail-head teacher model and a loss of the tail-tail teacher model.

The determining the class of the target node by using the first neural network may include adjusting contribution proportions of the loss of the head-head teacher model and the loss of the head-tail teacher model that contribute to a loss of the head student model to be changed with a progress of training iterations for the head student model.

The determining the class of the target node by using the second neural network may include adjusting contribution proportions of the loss of the tail-head teacher model and the loss of the tail-tail teacher model that contribute to a loss of the tail student model to be changed with a progress of training iterations for the tail student model.

In accordance with another aspect of the present disclosure, there is provided a non-transitory computer-readable recording medium storing a computer program, which comprises instructions for a processor to perform a neural network control method, the method comprises: classifying a target node into a head group or a tail group based on a reference feature value representing each class included in a graph structure; determining, if the target node is classified into the head group, a class of the target node by using a first neural network trained to derive embeddings based on a node with a class corresponding to the head group among nodes included in the graph structure; and determining, if the target node is classified into the tail group, a class of the target node by using a second neural network trained to derive embeddings based on a node with a class corresponding to the tail group among nodes included in the graph structure.

According to an embodiment of the present disclosure, the long tail phenomenon occurring in the node classes of the graph structure and the long tail phenomenon occurring in the node degrees of the graph structure are simultaneously considered to classify data into groups, thereby generating data groups where a balanced distribution is achieved, and then a student model is trained through the knowledge distillation by using the loss of a teacher model trained based on data of each group, thereby providing a robust artificial intelligence model in case of the long tail phenomenon of the data.

The effects achievable from the present disclosure are not limited to the effects described above, and other effects not mentioned above will be clearly understood by those skilled in the art in the art, where the present disclosure belongs, from the following description.

DETAILED DESCRIPTION

Figure 1:
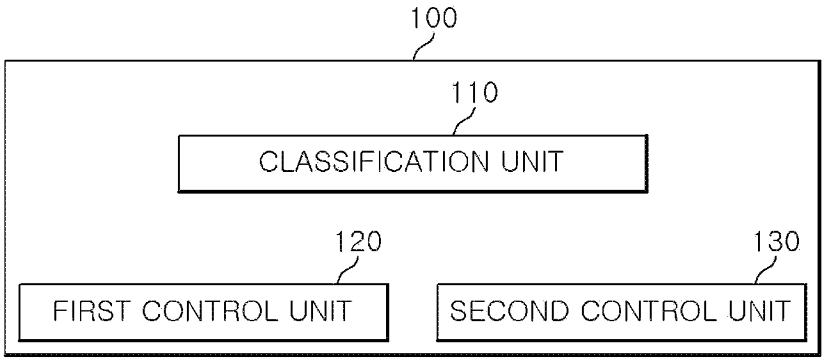
FIG. 1 is a functional block diagram of a neural network control apparatus according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

A graph neural network control apparatus 100 based on the classification into classes and degrees of a graph (hereinafter, referred to as "neural network control apparatus" 100) according to an embodiment of the present disclosure trains and uses a neural network taking into consideration that a long tail phenomenon occurs in the "classes" of a graph structure and in the "degrees" of the graph structure.

The graph structure refers to a data structure composed of nodes and edges. A graph structure may include multiple nodes, each including data related to a specific object. A node can be classified into specific categories based on the characteristics of the data that the node includes, and the identification information of the classified category is referred to as 'class.' An edge connects a node and another node, and it may include information about the relationships between the connected nodes. The number of edges connected to a particular node is known as its 'degree.' Nodes directly connected by edges to a specific node are referred to as 'neighboring nodes.' A feature value can be derived from data included in each node through specific algorithms, and nodes with similar feature values within a predetermined range of a feature value of a particular node are referred to as 'similar nodes.'

The long tail phenomenon refers to a distribution of data, when represented graphically based on a specific variable, that is divided into two parts: the head portion of the first 20% of the specific variable, which encompasses the majority of data, and the tail portion of the remaining 80%, which encompasses a small number of data, forming an elongated tail-like shape. In terms of an algorithmic perspective, even if an artificial intelligence model is exceptional, training with data, as is, following the long tail phenomenon can lead to a significant decrease in accuracy for the tail portion of the remaining 80%, where a small amount of data is dispersely distributed, compared to the accurate judgments for the head portion of the first 20% where the majority of data is distributed. Therefore, to improve the accuracy of models in artificial intelligence training, a balanced training based on various data is necessary.

Hereinafter, the neural network control apparatus 100 according to an embodiment of the present disclosure classifies data into groups to achieve a balanced distribution of entire data by considering the long tail phenomenon occurring in the node 'classes' of the graph structure and the long tail phenomenon occurring in the node 'degrees' of the graph structure, and trains a student model through the knowledge distillation by using the loss of a teacher model trained based on data of each group, thereby providing a robust artificial intelligence model in case of the long tail phenomenon.

Figure 2:
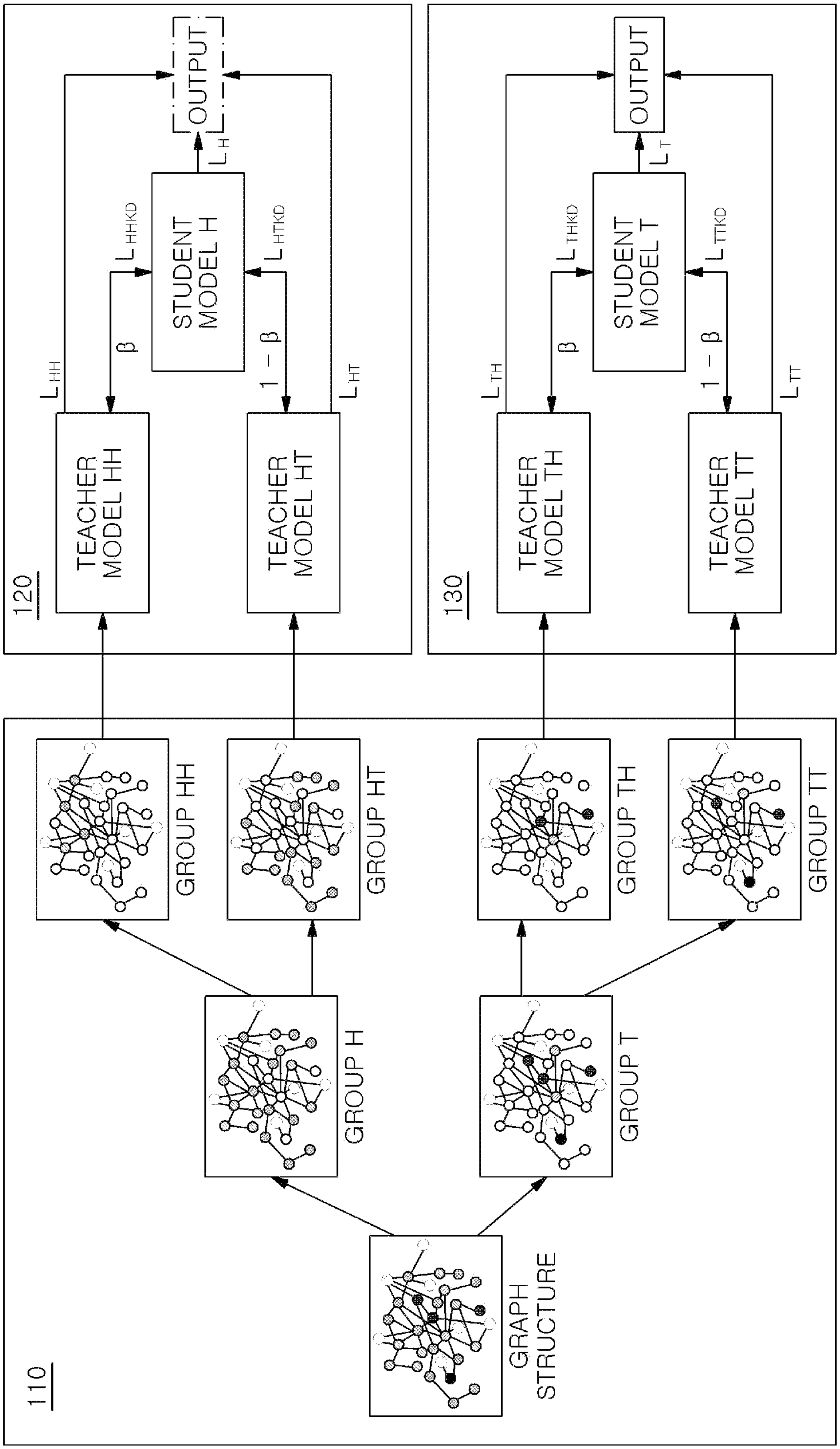
FIG. 2 is a conceptual diagram illustrating the operations, represented by blocks, for training the first neural network and the second neural network performed by the neural network control apparatus according to an embodiment of the present disclosure.
Figure 3:
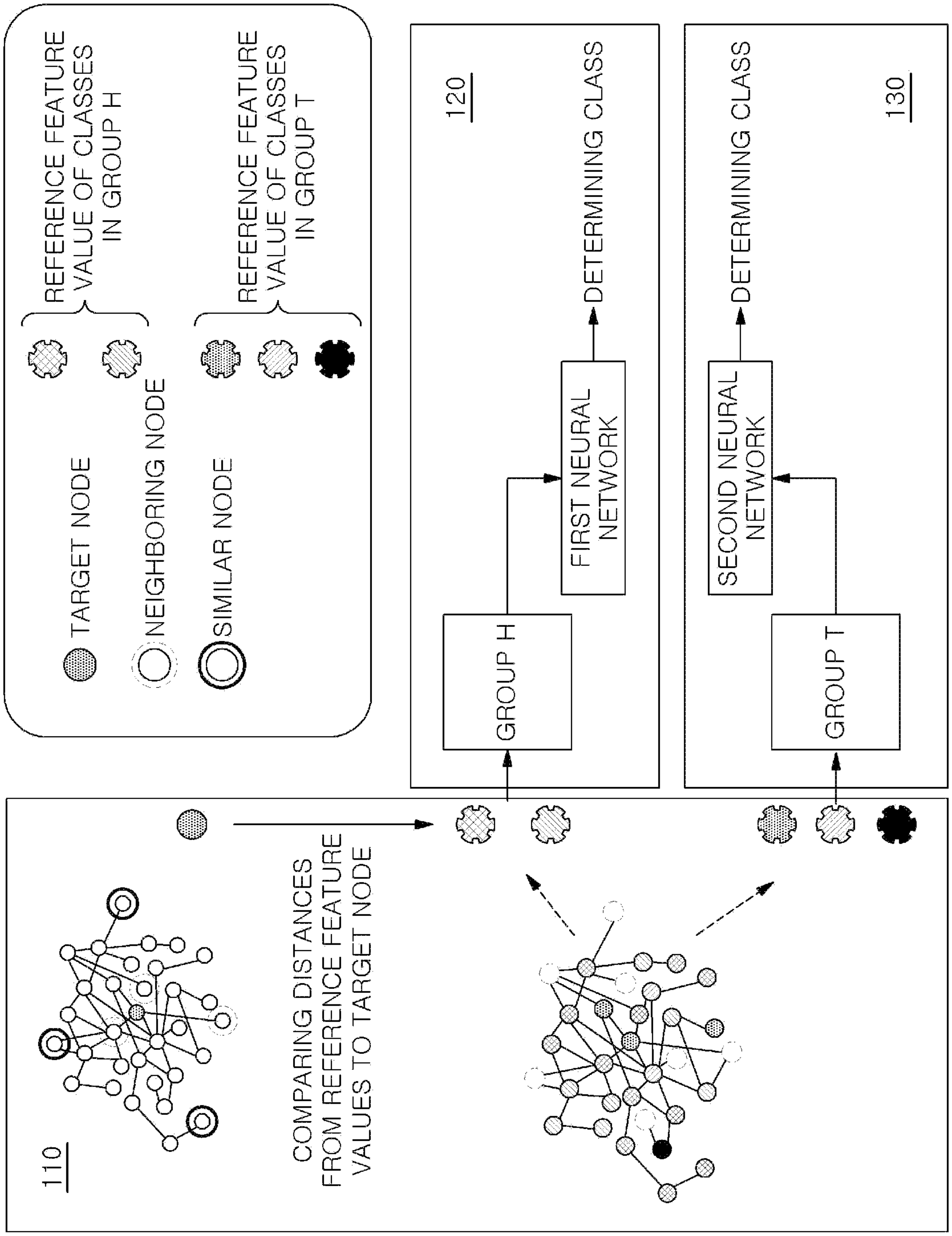
FIG. 3 is a conceptual diagram illustrating the operations, represented by blocks, for determining a class of a target node after neural network training performed by the neural network control apparatus according to an embodiment of the present disclosure.

In the present detailed description, an overview of the configuration of the neural network control apparatus 100 in FIG. 1 is explained, and then the process of training the neural network in FIG. 2 and the process of determining a class of a target node by using the neural network in FIG. 3 will be separately explained.

FIG. 1 is a functional block diagram of a neural network control apparatus 100 according to an embodiment of the present disclosure.

Referring to FIG. 1, the neural network control apparatus 100 according to an embodiment of the present disclosure may include a classification unit 110, a first control unit 120, and a second control unit 130. The neural network control apparatus 100 according to an embodiment of the present disclosure may perform overall operations by one or more processors, and one or more processors may control the functional blocks included in FIG. 1 to perform operations described later in FIGS. 2 and 3.

FIG. 2 is a conceptual diagram illustrating the operations, represented by blocks, for training the first neural network and the second neural network performed by the neural network control apparatus 100 according to an embodiment of the present disclosure.

Referring to FIG. 2, the classification unit 110 may aggregate the number of nodes for each class included in the graph structure, and then classify nodes included in a class where the number of nodes is greater than a predetermined ratio (e.g., top 20%) into a group H and nodes included in a class where the number of nodes is less than a predetermined ratio (e.g., bottom 80%) into a group T. The ratios of 20% and 80% that distinguish the group H and group T described above are just an example, and the ratios classifying data into the group H and group T can be determined to various ratios according to the administrator's choice.

The classification unit 110 may aggregate the number of nodes for each degree included in the graph structure, and then classify nodes having a degree for which the number of nodes among nodes included in the group H is greater than a predetermined ratio (e.g., top 20%) into a group HH, nodes having a degree for which the number of nodes among nodes included in the group H is less than a predetermined ratio (e.g., bottom 80%) into a group HT, nodes having a degree for which the number of nodes among nodes included in the group T is greater than a predetermined ratio (e.g., top 20%) into a group TH, and nodes having a degree for which the number of nodes among nodes included in the group T is less than a predetermined ratio (e.g., bottom 80%) into a group TT, respectively.

In other words, the classification unit 110 may classify nodes in the graph structure into four groups: group HH, group HT, group TH, and group TT by considering the long tail phenomenon based on the two variables of the graph structure, 'class' and 'degree.' Accordingly, nodes in each of the group HH, group HT, group TH, and group TT can show a balanced distribution in terms of 'class' or 'degree.'

The first control unit 120 may generate a first neural network by performing GNN (Graph Neural Network) training to derive graph structure embeddings based on nodes of the graph structure included in the group H (which includes the group HH and group HT).

The first neural network according to an embodiment of the present disclosure may include a teacher model HH, teacher model HT, and student model H.

The first control unit 120 may train the teacher model HH to derive graph structure embeddings based on nodes included in the group HH and a loss trained by the teacher model HH during this process is denoted as $L_{HH}$.

The first control unit 120 may train the teacher model HT to derive graph structure embeddings based on nodes in the group HT and a loss trained by the teacher model HT during this process is denoted as $L_{HT}$.

The first control unit 120 may train the student model H to classify classes of nodes (e.g., supervised learning) included in the group H by using Knowledge Distillation. The first control unit 120 may set the loss $L_{HH}$ pre-trained by the teacher model HH to an initial value of a loss $L_{HHKD}$ and then use the data of the group HH to train the loss $L_{HHKD}$. The first control unit 120 may set the loss $L_{HT}$ pre-trained by the teacher model HT to an initial value of a loss $L_{HTKD}$ and then use the data of the group HT to train the loss $L_{HTKD}$. At this time, the first control unit 120 may adjust the contribution proportion of $L_{HHKD}$ $\beta$ and the contribution proportion of $L_{HTKD}$ $1-\beta$, that contribute to the training of a total loss $L_H$ of the student model H, to be changed with the progress of training iterations. For example, the first control unit 120 may set the value of $\beta$ to take the form of a negative logarithmic or a negative exponential function in order to decreas the value from 1 to 0 over training iterations, that is the value of $\beta$ to be close to 1 in an initial training stage and then close to 0 in later training stages.

The second control unit 130 may generate a second neural network by performing GNN (Graph Neural Network) training to derive graph structure embeddings based on nodes of the graph structure included in the group T (which includes the group TH and group TT).

The second neural network according to an embodiment of the present disclosure may include a teacher model TH, teacher model TT, and student model T.

The second control unit 130 may train the teacher model TH to derive graph structure embeddings based on nodes included in the group TH and a loss trained by the teacher model TH during this process is denoted as $L_{TH}$.

The second control unit 130 may train the teacher model TT to derive graph structure embeddings based on nodes in the group TT and a loss trained by the teacher model TT during this process is denoted as $L_{TT}$.

The second control unit 130 may train the student model T to classify classes of nodes (e.g., supervised learning) included in the group T by using Knowledge Distillation. The second control unit 130 may set the loss $L_{TH}$ pre-trained by the teacher model TH to an initial value of a loss $L_{THKD}$ and then use the data of the group TH to train the loss $L_{THKD}$. The second control unit 130 may set the loss $L_{TT}$ pre-trained by the teacher model TT to an initial value of a loss $L_{TTKD}$ and then use the data of the group TT to train the loss $L_{TTKD}$. At this time, the second control unit 130 may adjust the contribution proportion of $L_{THKD}$ $\beta$ and the contribution proportion of $L_{TTKD}$ $1-\beta$, that contribute to the training of a total loss $L_T$ of the student model T, to be changed with the progress of training iterations. For example, the second control unit 130 may set the value of $\beta$ to take the form of a negative logarithmic or a negative exponential function in order to decreas the value from 1 to 0 over training iterations, that is the value of $\beta$ to be close to 1 in an initial training stage and then close to 0 in later training stages.

FIG. 3 is a conceptual diagram illustrating the operations, represented by blocks, for determining a class of a target node after neural network training performed by the neural network control apparatus 100 according to an embodiment of the present disclosure.

Referring to FIG. 3, the classification unit 110 may classify a target node into the group H or the group T based on feature values representing each class included in the graph structure.

For instance, the classification unit 110 may, in advance, calculate and store a reference feature value for each class by averaging feature values of nodes included in each class included in the graph structure. For example, assuming the graph structure has five classes: A, B, C, D, and E, a reference feature value for the class A may be calculated by averaging feature values of entire nodes in the class A. This procedure can be repeated for classes B, C, D, and E to obtain their respective reference feature values. At this time, during the training process illustrated in FIG. 2, it is assumed that classes A and B are classified into the group H, while classes C, D, and E are classified into the group T. Thereafter, upon receiving a target node as input, the classification unit 110 may calculate a distance (e.g., cosine similarity) between a feature value of the target node and a reference feature value for each class, and then classify the target node into a group including a class with the closest distance (e.g., the highest cosine similarity) to the target node.

In addition, the classification unit 110 may calculate a first feature value of a target node itself, a second feature value of a neighboring node based on the target node, and a third feature value of a similar node based on the target node, and obtain a fourth feature value by averaging the first feature value, the second feature value, and the third feature value. Thereafter, the classification unit 110 may calculate a distance (e.g., cosine similarity) between the fourth feature value of the target node and a reference feature value for each class, and then classify the target node into a group including a class with the closest distance (e.g., the highest cosine similarity) to the target node.

For example, if a feature value (or fourth feature value) of the target node is closest to the reference feature value of the class A, the target node may be classified into the group H where the class A belongs. Similarly, if a feature value (or fourth feature value) of the target node is closest to the reference feature value of the class D, the target node may be classified into the group T where the class D belongs.

If a target node is classified into the group H, the first control unit 120 may determine a class of the target node by using the first neural network (e.g., student model H) trained following the operation of FIG. 2.

If a target node is classified into the group T, the second control unit 130 may determine a class of the target node by using the second neural network (e.g., student model T) trained following the operation of FIG. 2.

Figure 4:
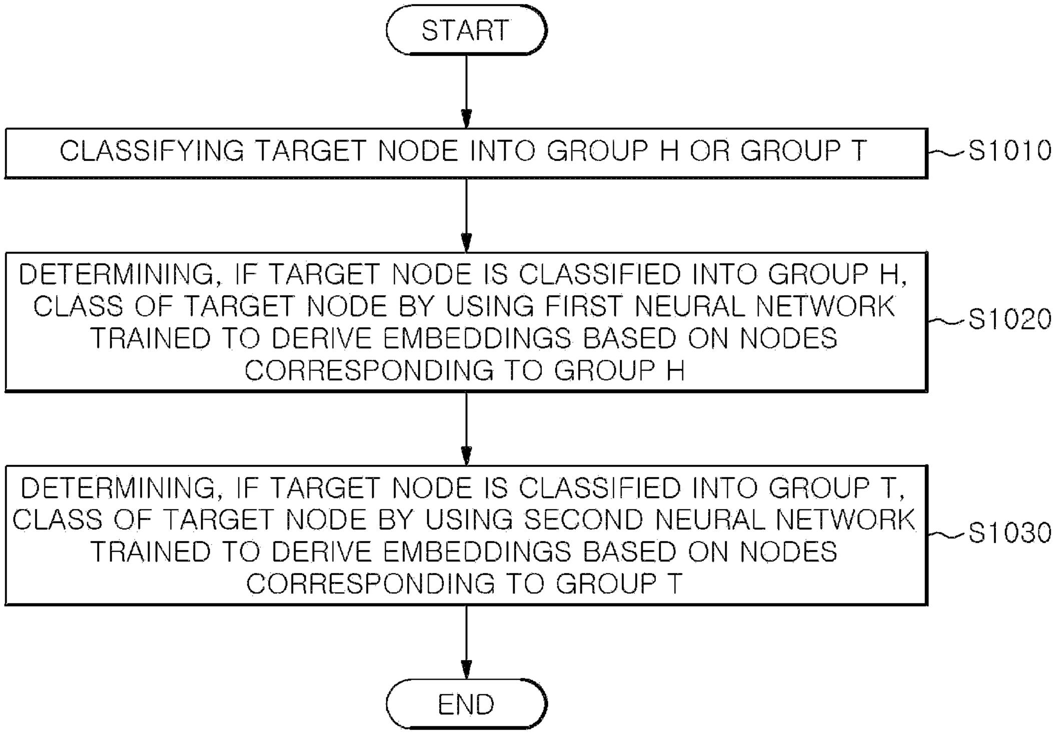
FIG. 4 is a flowchart illustrating the process of the neural network controlling method performed by the neural network control apparatus according to an embodiment of the present disclosure.

FIG. 4 is a flowchart illustrating the process of the neural network controlling method performed by the neural network control apparatus 100 according to an embodiment of the present disclosure. Each step of the neural network control method according to FIG. 4 may be performed by the neural network control apparatus 100 explained through FIG. 1, and each step may be explained as follows.

In a step S1010, the classification unit 110 may classify a target node into the group H or the group T based on reference feature values representing each class included in the graph structure.

In a step S1020, if the target node is classified into the group H, the first control unit 120 may determine a class of the target node by using the first neural network trained to derive embeddings based on nodes with a class corresponding to the group H among nodes included in the graph structure.

In a step S1030, if the target node is classified into the group T, the second control unit 130 may determine a class of the target node by using the second neural network trained to derive embeddings based on nodes with a class corresponding to the group T among nodes included in the graph structure.

However, in addition to the steps illustrated in FIG. 4, new steps that each functional block performs can be added to the steps of FIG. 4 by variously configuring embodiments where the above-described classification unit 110, the first control unit 120, and the second control unit 130 perform operations explained with FIGS. 1 to 3. Since configuration of additional steps and operations required for components performing each step to perform respective steps are explained in FIGS. 1 to 3, redundant description can be omitted.

According to above-described embodiments, data may be classified into groups by simultaneously considering long tail phenomenon occurring in the node classes of the graph structure and long tail phenomenon occurring in the node degrees of the graph structure, thereby generating data groups with balanced distributions within each group, and then a student model is trained through knowledge distillation by using a loss of a teacher model trained based on data of each group, thereby providing robust artificial intelligence models in case of the long tail phenomenon in the data.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A neural network control apparatus comprising:

a memory storing one or more instructions; and a processor configured to execute the one or more instructions stored in the memory, wherein the instructions, when executed by the processor, cause the processor to:

classify a target node into a head group or a tail group based on a reference feature value for each class included in a graph structure;

determine, if the target node is classified into the head group, a class of the target node by using a first neural network trained to derive embeddings based on a node with a class corresponding to the head group among nodes included in the graph structure;

determine, if the target node is classified into the tail group, a class of the target node by using a second neural network trained to derive embeddings based on a node with a class corresponding to the tail group among nodes included in the graph structure;

aggregate the number of nodes for each class included in the graph structure;

classify a node included in a class where the number of nodes for each class is greater than a predetermined ratio into the head group;

classify a node included in a class where the number of nodes for each class is less than a predetermined ratio into the tail group;

aggregate the number of nodes for each degree included in the graph structure;

classify a node, among nodes included in the head group, having a degree for which the number of nodes is greater than a predetermined ratio into a head-head group;

classify a node, among nodes included in the head group, having a degree for which the number of nodes is less than a predetermined ratio into a head-tail group;

classify a node, among nodes included in the tail group, having a degree for which the number of nodes is greater than a predetermined ratio into a tail-head group; and classify a node, among nodes included in the tail group, having a degree for which the number of nodes is less than a predetermined ratio into a tail-tail group.

2. The neural network control apparatus of claim 1, wherein the processor is configured to calculate the reference feature value for each class by averaging feature values of nodes included in the each class included in the graph structure.

3. The neural network control apparatus of claim 2, wherein the processor is configured to calculate cosine similarity between a feature value of the target node and the reference feature value for each class, and classify the target node into a group including a class with a highest cosine similarity to the target node.

4. The neural network control apparatus of claim 1, wherein the first neural network includes a head-head teacher model trained to derive embeddings of the graph structure based on a node included in the head-head group, a head-tail teacher model trained to derive embeddings of the graph structure based on a node included in the head-tail group, and a head student model trained to classify classes of nodes included in the head group based on the nodes included in the head group through knowledge distillation using a loss of the head-head teacher model and a loss of the head-tail teacher model, and the second neural network includes a tail-head teacher model trained to derive embeddings of the graph structure based on a node included in the tail-head group, a tail-tail teacher model trained to derive embeddings of the graph structure based on a node included in the tail-tail group, and a tail student model trained to classify classes of nodes included in the tail group based on the nodes included in the tail group through knowledge distillation using a loss of the tail-head teacher model and a loss of the tail-tail teacher model.

5. The neural network control apparatus of claim 4, wherein the processor is configured to adjust contribution proportions of the loss of the head-head teacher model and the loss of the head-tail teacher model that contribute to a loss of the head student model to be changed with a progress of training iterations for the head student model, and adjust contribution proportions of the loss of the tail-head teacher model and the loss of the tail-tail teacher model that contribute to a loss of the tail student model to be changed with a progress of training iterations for the tail student model.

6. The neural network control apparatus of claim 1, wherein the head group indicates a head portion in which a majority of data in the graph structure is encompassed, and the tail group indicates a tail portion in which a small number of data in the graph structure is distributed.

7. A neural network control method preformed by a neural network control apparatus including a memory and a processor, the method comprising:

classifying a target node into a head group or a tail group based on a reference feature value for each class included in a graph structure;

determining, if the target node is classified into the head group, a class of the target node by using a first neural network trained to derive embeddings based on a node with a class corresponding to the head group among nodes included in the graph structure; and determining, if the target node is classified into the tail group, a class of the target node by using a second neural network trained to derive embeddings based on a node with a class corresponding to the tail group among nodes included in the graph structure, wherein the classifying the target node includes aggregating the number of nodes for each class included in the graph structure, classifying a node included in a class where the number of nodes for each class is greater than a predetermined ratio into the head group, and classifying a node included in a class where the number of nodes for each class is less than a predetermined ratio into the tail group, and wherein the classifying the target node includes:

aggregating the number of nodes for each degree included in the graph structure;

classifying a node, among nodes included in the head group, having a degree for which the number of nodes is greater than a predetermined ratio into a head-head group;

classifying a node, among nodes included in the head group, having a degree for which the number of nodes is less than a predetermined ratio into a head-tail group;

classifying a node, among nodes included in the tail group, having a degree for which the number of nodes is greater than a predetermined ratio into a tail-head group; and classifying a node, among nodes included in the tail group, having a degree for which the number of nodes is less than a predetermined ratio into a tail-tail group.

8. The neural network control method of claim 7, wherein the classifying the target node includes calculating the reference feature value for each class by averaging feature values of nodes included in the each class included in the graph structure.

9. The neural network control method of claim 8, wherein the classifying the target node includes calculating cosine similarity between a feature value of the target node and the reference feature value for each class, and classifying the target node into a group including a class with a highest cosine similarity to the target node.

10. The neural network control method of claim 7, wherein the first neural network includes a head-head teacher model trained to derive embeddings of the graph structure based on a node included in the head-head group, a head-tail teacher model trained to derive embeddings of the graph structure based on a node included in the head-tail group, and a head student model trained to classify classes of nodes included in the head group based on the nodes included in the head group through knowledge distillation using a loss of the head-head teacher model and a loss of the head-tail teacher model, and the second neural network includes a tail-head teacher model trained to derive embeddings of the graph structure based on a node included in the tail-head group, a tail-tail teacher model trained to derive embeddings of the graph structure based on a node included in the tail-tail group, and a tail student model trained to classify classes of nodes included in the tail group based on the nodes included in the tail group through knowledge distillation using a loss of the tail-head teacher model and a loss of the tail-tail teacher model.

11. The neural network control method of claim 10, wherein the determining the class of the target node by using the first neural network includes adjusting contribution proportions of the loss of the head-head teacher model and the loss of the head-tail teacher model that contribute to a loss of the head student model to be changed with a progress of training iterations for the head student model, and wherein the determining the class of the target node by using the second neural network includes adjusting contribution proportions of the loss of the tail-head teacher model and the loss of the tail-tail teacher model that contribute to a loss of the tail student model to be changed with a progress of training iterations for the tail student model.

12. The neural network control method of claim 7, wherein the head group indicates a head portion in which a majority of data in the graph structure is encompassed, and the tail group indicates a tail portion in which a small number of data in the graph structure is distributed.

13. A non-transitory computer-readable storage medium including computer-executable instructions, which cause, when executed by a processor, the processor to perform a neural network control method comprising:

classifying a target node into a head group or a tail group based on a reference feature value representing each class included in a graph structure;

determining, if the target node is classified into the head group, a class of the target node by using a first neural network trained to derive embeddings based on a node with a class corresponding to the head group among nodes included in the graph structure; and determining, if the target node is classified into the tail group, a class of the target node by using a second neural network trained to derive embeddings based on a node with a class corresponding to the tail group among nodes included in the graph structure, wherein the classifying the target node includes aggregating the number of nodes for each class included in the graph structure, classifying a node included in a class where the number of nodes for each class is greater than a predetermined ratio into the head group, and classifying a node included in a class where the number of nodes for each class is less than a predetermined ratio into the tail group, and wherein the classifying the target node includes:

aggregating the number of nodes for each degree included in the graph structure;

classifying a node, among nodes included in the head group, having a degree for which the number of nodes is greater than a predetermined ratio into a head-head group;

classifying a node, among nodes included in the head group, having a degree for which the number of nodes is less than a predetermined ratio into a head-tail group;

classifying a node, among nodes included in the tail group, having a degree for which the number of nodes is greater than a predetermined ratio into a tail-head group; and classifying a node, among nodes included in the tail group, having a degree for which the number of nodes is less than a predetermined ratio into a tail-tail group.

* * * * *